US010667330B2

(12) United States Patent
Sarno et al.

(10) Patent No.: US 10,667,330 B2
(45) Date of Patent: *May 26, 2020

(54) HEATING OF AN AERODYNAMIC MEASUREMENT PROBE

(71) Applicant: THALES, Courbevoie (FR)

(72) Inventors: Claude Sarno, Etoile sur Rhone (FR); Romain Hodot, Saint Peray (FR)

(73) Assignee: THALES, Courbevoie (FR)

( * ) Notice: Subject to any disclaimer, the term of this patent is extended or adjusted under 35 U.S.C. 154(b) by 671 days.

This patent is subject to a terminal disclaimer.

(21) Appl. No.: 15/094,882

(22) Filed: Apr. 8, 2016

(65) Prior Publication Data

US 2016/0302259 A1 Oct. 13, 2016

(30) Foreign Application Priority Data

Apr. 10, 2015 (FR) .................................... 15 00736

(51) Int. Cl.
*H05B 3/00* (2006.01)
*B64D 43/02* (2006.01)
*G01P 5/165* (2006.01)
*B33Y 80/00* (2015.01)
*B64D 15/00* (2006.01)

(52) U.S. Cl.
CPC .............. *H05B 3/0014* (2013.01); *B33Y 80/00* (2014.12); *B64D 15/00* (2013.01); *B64D 43/02* (2013.01); *G01P 5/165* (2013.01)

(58) Field of Classification Search
CPC ........ B64D 15/00; B64D 15/02; B64D 15/06; B64D 15/12; B64D 43/02; H05B 3/0014; G01P 5/165; G01P 5/16; G01P 5/14; B33Y 80/00
See application file for complete search history.

(56) References Cited

U.S. PATENT DOCUMENTS

| 4,275,603 A * | 6/1981 | Kalocsay ................ G01P 5/165 165/104.26 |
| 5,257,536 A | 11/1993 | Beigbeder et al. |
| 9,849,993 B2 * | 12/2017 | Sarno .................... B64D 15/06 |
| 2003/0105538 A1 | 6/2003 | Wooten |
| 2013/0186601 A1 * | 7/2013 | Monson ............ H05K 7/20672 165/104.26 |
| 2014/0190162 A1 | 7/2014 | Fonseca |
| 2016/0304210 A1 * | 10/2016 | Wentland ............... B33Y 70/00 |

FOREIGN PATENT DOCUMENTS

| DE | 10 2010 046580 A1 | 3/2012 |
| FR | 2 665 539 A1 | 2/1992 |
| FR | 2 833 347 A1 | 6/2003 |
| WO | 2012/062253 A2 | 5/2012 |

* cited by examiner

*Primary Examiner* — Shawntina T Fuqua
(74) *Attorney, Agent, or Firm* — Baker & Hostetler LLP

(57) ABSTRACT

An aerodynamic measurement probe comprises a part to be sited in the region of the skin of an aircraft and means for heating the part. The heating means comprise a thermodynamic loop comprising a closed circuit in which a heat-transfer fluid circulates, the closed circuit comprising an evaporator and a zone in which the heat-transfer fluid can be condensed in the appendage in order to heat it. Outside the evaporator, the circuit in which the fluid circulates is formed by a tubular duct of open cross section.

10 Claims, 5 Drawing Sheets

HEATING OF AN AERODYNAMIC MEASUREMENT PROBE

CROSS-REFERENCE TO RELATED APPLICATIONS

This application claims priority to foreign French patent application No. FR 1500736, filed on Apr. 10, 2015, the disclosures of which are incorporated by reference in their entirety.

FIELD OF THE INVENTION

The invention relates to the heating of an aerodynamic measurement probe intended to be sited in the region of the skin of the aircraft.

In order to perform its mission, an aircraft comprises several probes comprising parts that lie flush with, or appendages that protrude from, the skin of the aircraft. These appendages or these flush parts belong to probes notably making it possible to measure various aerodynamic parameters of the air stream surrounding the aircraft, such as notably the total pressure, the static pressure, the temperature or the incidence of the air stream in the vicinity of the skin of the aircraft. The total pressure, when associated with the static pressure, makes it possible to determine the local speed of the air stream in the vicinity of the probe. Other probes make it possible for example to measure the local incidence of an air stream. The incidence probes may comprise mobile appendages intended to orient themselves along the stream lines of the air surrounding the probe. The orientation of the probe makes it possible to determine the incidence of the air stream. Other incidence probes may be equipped with fixed appendages equipped with several pressure tappings. The pressure difference measured between these pressure tappings also makes it possible to determine the incidence of the air stream surrounding the probe.

BACKGROUND

When flying at high altitude, the aircraft may encounter icing conditions. More specifically, ice may form on the skin and on the appendages of the aircraft. The appearance of ice is particularly problematical for aerodynamic probes the profiles of which may become altered by ice and the pressure tapping orifices of which may become blocked.

One solution to avoiding the formation of ice is to heat the appendages. At the present time, heating is mostly performed using electrical resistances embedded in the appendages. Heating is achieved through joule effect. For example, in order to heat a total-pressure probe, it is necessary to dissipate several hundred watts. More specifically, this type of probe is formed of a mast bearing a tube that is closed at one end and known as a Pitot tube. Heating the probe is achieved using a heating resistance produced in the form of a heating wire wound in the body of the probe, namely both in the mast and in the Pitot tube. In order to create the heating wire use is commonly made of an electrical conductor containing an alloy of iron and of nickel coated in an inorganic insulator such as alumina or magnesia. The insulator is itself coated with a sheath of nickel or of inconel to allow wire to be soldered to the body of the probe. One method for producing such a probe is, for example, described in patent application FR 2 833 347 filed in the name of the Applicant Company.

Creating the heating wire and assembling it to the probe entail a series of complex and expensive operations.

Another way of heating a Pitot tube probe has been conceived of in patent U.S. Pat. No. 4,275,603. That document describes the use of a heat pipe supplying thermal energy around the tube. The return of the heat-transfer fluid to the liquid state is brought about in a porous material. That allows the probe to be arranged in any possible orientation on the skin of the aircraft. In practice, that solution offers no industrial advantage because of the difficulty there is in inserting a porous material into a probe. In addition, the use of a porous material requires the zone of the heat pipe at which evaporation takes place and the condensation zone to be close to one another. This is why this probe comprises a heating wire positioned in the mast of the probe as close as possible to the Pitot tube. If the evaporation zone were situated further away, the heat pipe would suffer from a loss of priming. As a result, the method of producing such a probe is more complex than the method of using only a heating wire. Specifically, in such a probe, it is necessary for both the heating wire and the heat pipe to be outside the skin of the aircraft.

SUMMARY OF THE INVENTION

The invention seeks to propose a new heated probe that lies flush or that has a heated external appendage, that is far simpler to produce than the one described in the prior art.

To this end, one subject of the invention is an aerodynamic measurement probe intended to be fitted to an aircraft, the probe comprising a part intended to be sited in the region of a skin of the aircraft and means of heating the part. According to the invention, the heating means comprise a thermodynamic loop comprising a closed circuit in which a heat-transfer fluid circulates, the closed circuit comprising an evaporator and a zone in which the heat-transfer fluid can be condensed in the appendage in order to heat it; outside the evaporator, the circuit in which the fluid circulates is formed by a tubular duct of open cross section.

Advantageously, the duct is configured so that the fluid circulates therein through capillarity. Alternatively, the probe comprises a pump for circulating the heat-transfer fluid.

The tubular duct may form a single thermodynamic loop outside the evaporator. Alternatively, the tubular duct forms several thermodynamic loops through which the heat-transfer fluid circulates in parallel outside the evaporator.

The part intended to be heated may be configured to lie flush with the skin of the aircraft. Alternatively, the part intended to be heated is an appendage configured to be positioned so that it protrudes relative to the skin of the aircraft.

In the embodiment in which the part intended to be heated is an appendage, the equipment advantageously comprises a base intended to fix the equipment to the skin of the aircraft. The appendage is then positioned on a first side of the base and the evaporator is positioned on a second side of the base, the opposite side to the first. This embodiment would be impossible with a probe and a heat pipe as described in patent U.S. Pat. No. 4,275,603.

The heating means may comprise an electrical resistance allowing heat energy to be supplied to the evaporator.

The invention also relates to a method of producing an aerodynamic measurement probe comprising a body in which the tubular duct of open cross section is produced, the method being characterized in that the body is produced using an additive manufacturing method.

BRIEF DESCRIPTION OF THE FIGURES

The invention will be better understood and further advantages will become apparent from reading the detailed description of one embodiment given by way of example, the description being illustrated by the attached drawing in which.

For the sake of clarity, in the various figures the same elements bear the same references.

DETAILED DESCRIPTION OF THE INVENTION

Figure 1A:
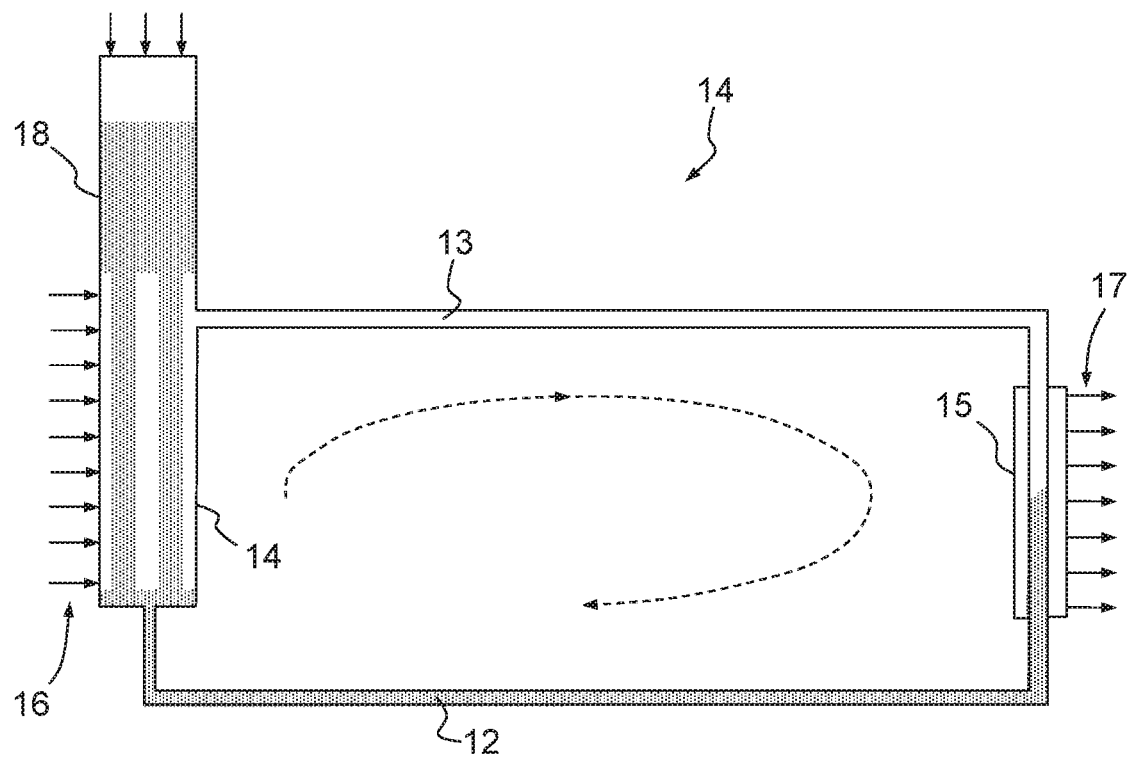
FIG. 1a schematically depicts a thermodynamic loop able to heat aeronautical equipment according to the invention.

FIG. 1a schematically depicts a thermodynamic loop 11 through which a heat-transfer fluid circulates in closed circuit. In this loop, the fluid may be present in one of two phases: liquid 12 and vapor 13. The latent heat of transition between these two phases is used to carry heat energy between an evaporator 14 and a condenser 15. This type of thermodynamic loop is widely used for cooling electronic components that dissipate heat as they operate. In general, a supply of heat, indicated schematically by arrows 16, to the evaporator 14 is carried by the fluid in vapor phase 13 to the condenser 15 where the supply of energy is returned to the surrounding environment. This return is indicated schematically by arrows 17. The closed circuit also comprises a reservoir 18 containing heat-transfer fluid in the liquid state. The reservoir 18 is sited close to the evaporator 14. The reservoir 18 supplies the loop 11 via the evaporator 14. Thus, as soon as a sufficient supply of energy has been collected by the evaporator 14, the fluid in the liquid state contained in the evaporator vaporizes. The increase in pressure caused by the evaporation drives the fluid in the vapor state 13 toward the condenser 15 where the fluid returns to its liquid state in order to return to the evaporator 14.

In the present invention, the thermodynamic loop 11 is used to heat up part of onboard aeronautical equipment. Onboard an aircraft, numerous items of equipment have appendages that protrude from the skin of the aircraft or parts that lie flush therewith. This equipment may be aerodynamic probes, antennas, sensors, etc. These appendages or these flush-mounted parts need to be heated in order to allow them to operate. This heating is particularly important in the case of the aerodynamic probes that have orifices used as pressure tappings. Heating makes it possible to prevent the formation of ice that could block these orifices. Incidence probes, which have a vane intended to orient itself in the stream lines of the stream of air surrounding the probe, are also sensitive to the ice that could form on the vane and alter its shape, thus leading to an incorrect measurement or even causing the vane to jam.

Figure 1B:
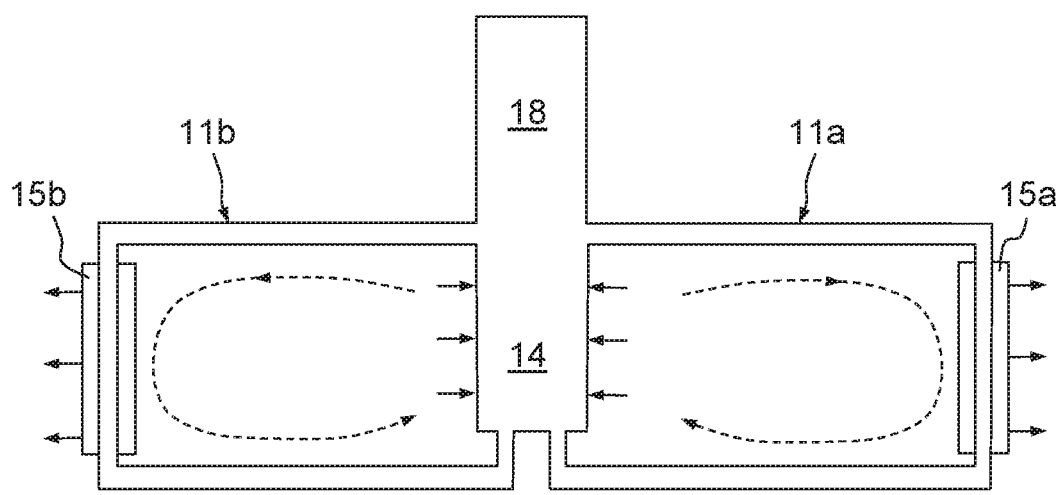
FIG. 1b schematically depicts several thermodynamic loops that can heat aeronautical equipment according to the invention.

FIG. 1b schematically depicts two thermodynamic loops 11a and 11b in which the heat-transfer fluid circulates in parallel outside of an evaporator 14 that is common to the various loops. These various loops 11a and 11b more specifically make it possible to heat various zones, forming condensers 15a and 15b, of an appendage or of part of a piece of aeronautical equipment. The invention may of course be implemented for more than two thermodynamic loops.

Figure 2:
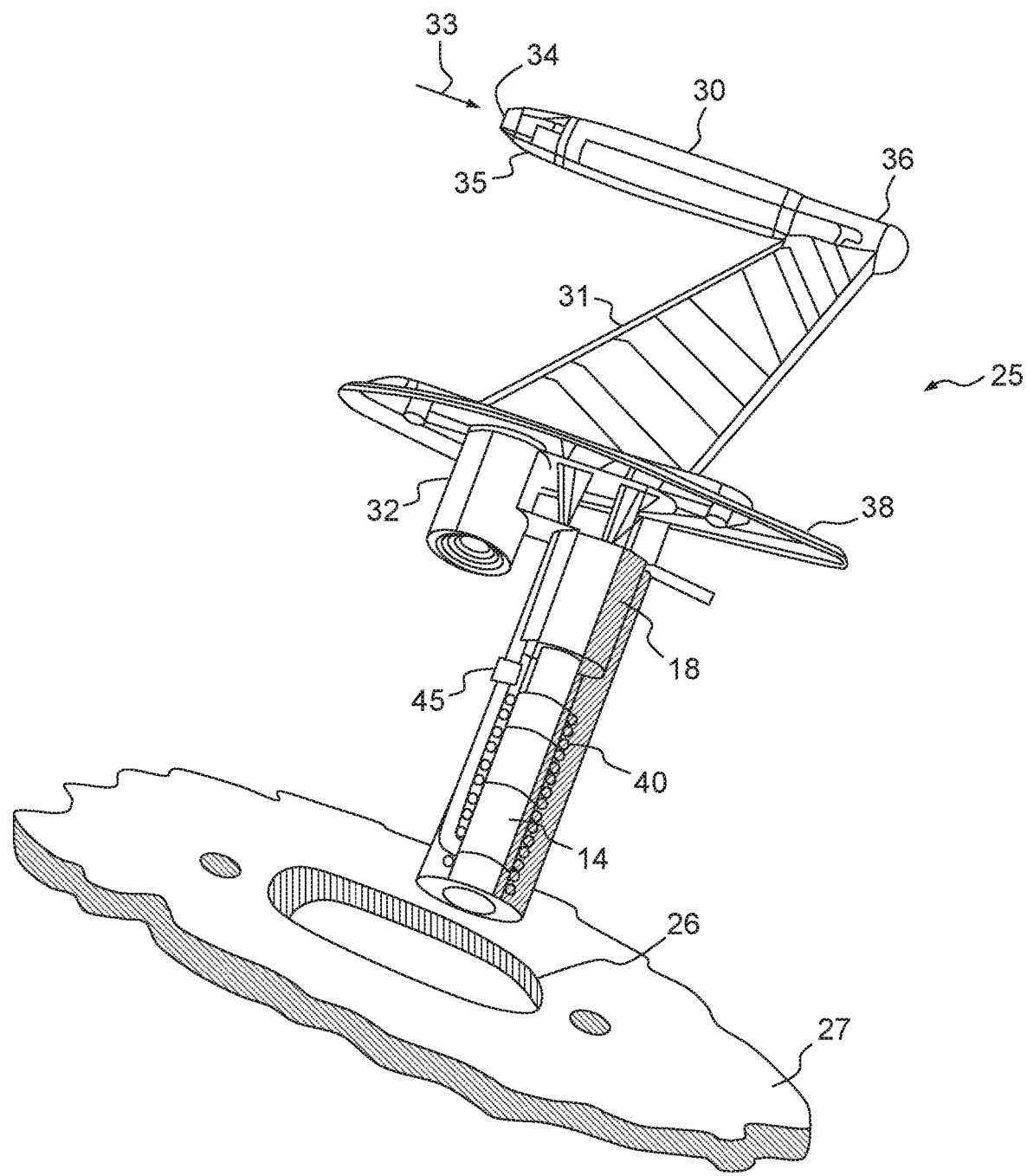
FIG. 2 depicts an aerodynamic probe intended to measure the total pressure and with which an aircraft is equipped.

FIG. 2 depicts an aeronautical probe 25 for measuring the total pressure of a stream of air surrounding the skin 27 of an aircraft. The probe 25 is intended to be fixed across an opening 26 made in the skin 27 of the aircraft. In FIG. 1, the skin 27, at its opening 26, is depicted as being some distance from the probe 25.

The probe 25 comprises a Pitot tube 30 and a mast 31 bearing the Pitot tube 30. The Pitot tube 30 and the mast 31 are external to the skin 27. The probe 25 also comprises a part internal to the skin 27, comprising a pneumatic connector 32 allowing pneumatic connection of the Pitot tube 30 to a pressure sensor situated inside the fuselage of the aircraft. The probe 25 is positioned on the skin 27 of the aircraft in such a way that the Pitot tube 30 is oriented substantially along a longitudinal axis of the aircraft, outside the boundary layer, so that the direction of the flow, indicated by an arrow 33, is substantially facing an inlet orifice 34 situated at a first end 35 of the Pitot tube 30.

A second end 36 of the Pitot tube 30, the opposite end to the end 35, is closed so as to form a stopping point in the stream of air tapped from the flow and entering the tube 30 via the orifice 34 thereof. At the end 36 of the tube, a pneumatic duct, not depicted in FIG. 1, opens into the tube 30 where it forms a pressure tapping in the region of which the air pressure is to be measured. The pneumatic duct is, for example, connected to a pressure sensor or to some other pressure-measuring device such as, for example, a flow meter. The pressure sensor allows effective measurement of the air pressure prevailing inside the tube 30 at the closed end 36 thereof. The pressure sensor may form part of the probe 25 or alternatively may be sited remotely. In that case, the pressure sensor is connected to the probe 25 by means of a pipe and of the pneumatic connector 32.

At the end 36, the tube 30 comprises one or more drain holes, not depicted, and that allow any water entering the tube 30 to be discharged. Apart from the drain hole or holes, the cross section of which is small in comparison with that of the tube 30, the tube 30 is closed at its end 36. The pressure measured at this end therefore represents the total pressure Pt of the air flow.

The mast 31 bears the Pitot tube 30 at its second end 36. The Pitot tube 30 has a substantially cylindrical shape and the mast 31 an elongate shape. The mast 31 for example is in the form of an airfoil the pressure face and suction face of which may be symmetric.

The probe 25 may comprise other pressure tappings, such as, for example, pressure tappings sited on the mast 31 or around the tube 30 on the cylindrical part thereof and making it possible to define the local incidence of the flow with respect to the probe 25 or measuring the static pressure of the flow.

The probe 25 comprises fixing means intended to fix the probe 25 to the skin 27 of the aircraft. These means for example comprise a base 38 formed by a shoulder intended to come into contact with the skin 27. Screws positioned around the opening 26 immobilize the base 38 with respect to the skin 27.

In the example depicted, the Pitot tube 30 is fixed with respect to the skin 27 of the aircraft. Of course it is possible for the Pitot tube 30 to be mounted on a mobile mast such as, for example, a vane which can orientate itself along the flow line, as described for example in the patent published under the No. FR 2 665 539 and filed on Aug. 3, 1990. The base 38 then comprises a pivot connection allowing the mast 31 to rotate with respect to the skin 27 about an axis perpendicular to the skin 27. Thus, when the local incidence of the flow in the vicinity of the probe 25 changes, the orientation of the Pitot tube 30 follows this incidence so as always to face into the flow. This improves the measurement of total pressure Pt during variations in the local incidence of the flow along the skin 27 of the aircraft.

The evaporator 14 and the reservoir 18 are positioned inside the fuselage of the aircraft on one side of the base 38. The condenser 15 is formed of a duct arranged in the mast 31 and in the Pitot tube 30. Heating means allow heat energy to be supplied to the evaporator 14. These means for example comprise a heating electrical resistance 40 arranged around the evaporator 14. Any other means allowing heat to be supplied to the evaporator may also be used in the context of the invention, such as, for example, passing a stream of hot air along the external walls of the evaporator 14. By being situated inside the fuselage, namely under the skin of the aircraft, the evaporator 14 and its heating means are protected from external attack.

It is also possible to position within the appendage a temperature sensor that allows its temperature to be measured so that the heating means can be slaved to this. Alternatively, a measurement of the temperature of the fluid in the evaporator 14 provides an indication of the temperature in the appendage.

Using a thermodynamic loop to heat the probe 25 and, more generally, an aeronautical appendage, offers the advantage of making it easier to regulate the temperature of the appendage by controlling the heating means sited remotely inside the skin of the aircraft in the vicinity of the appendage.

The fluids generally used as heat-transfer fluids in a two-phase thermodynamic loop may have high latent heats of transition, thereby making it possible to reduce the flow rate of fluid in the loop for the same level of heat exchange. Reducing the flow rate makes it possible to reduce the pressure drops in the loop. By way of example, methanol may be used as heat-transfer fluid.

According to the invention, the fluid circulates along a tubular duct 39 of open cross section between the evaporator 14 and the condenser 15, in the condenser 15 itself, and between the condenser 15 and the evaporator 14. In other words, outside of the evaporator 14, the circuit in which the fluid circulates is formed by the open-section tubular duct 39. What is meant by an open-section tubular duct is a duct that has no filling apart, of course, from the fluid. In particular, no porous material is present in the tubular duct 39. The internal walls of the tubular duct 39 are smooth to make it easier for the fluid to circulate and to limit pressure drops.

Figure 3A:
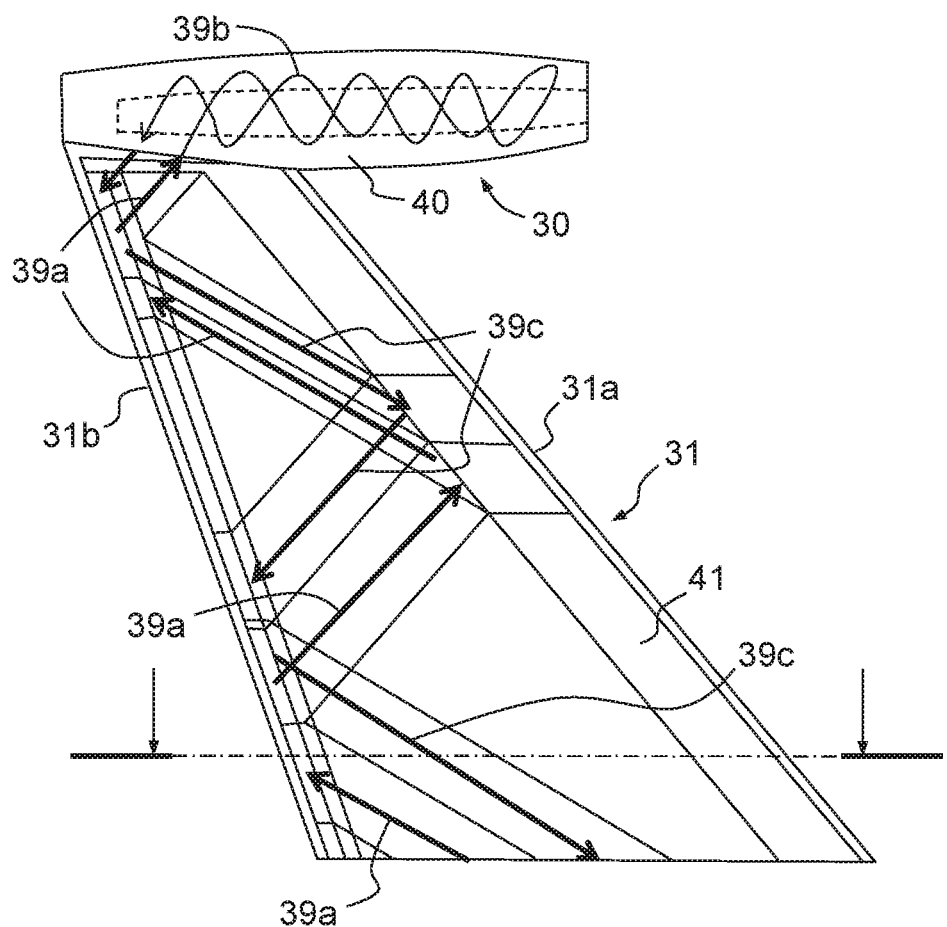
FIGS. 3a and 3b depict a mast and a Pitot tube forming external parts of the probe of FIG. 1.
Figure 3B:
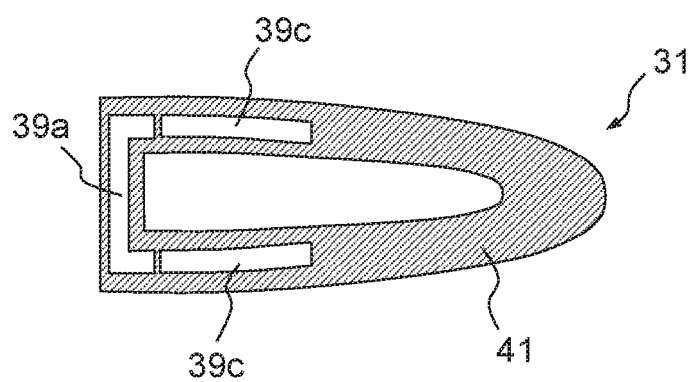

FIGS. 3a and 3b depict one example of a layout of the duct 39 with which the external parts of the probe 29 are equipped and through which the heat-transfer fluid for heating these external parts circulates.

The mast 31 and the tube 30 both comprise a jacket, 41 for the mast and 40 for the tube 30. The pneumatic duct used for measuring pressure passes along inside the jacket 41. The duct 39 is formed in the respective jackets. In the duct 39, the fluid circulating is liable to condense so as to heat the corresponding jacket or a part thereof as required.

More specifically, another advantage associated with the creation of the open-section tubular duct 39 is the capacity for autoadaptation of the exchanges of heat at the probe. Specifically, the coefficient of exchange between the fluid and the wall, the condensation coefficient, is connected with the temperature gradients between the fluid and the wall. The exchanges of heat are greater in the coldest zones of the probe 25. These coldest zones correspond to the zones of the jackets at which the external cooling is the greatest. This makes it possible to obtain a more even probe temperature.

FIG. 3a depicts the mast 31 and the Pitot tube 30 in profile. An example of the route followed by the duct 39 to the corresponding jackets can be seen distinctly there. FIG. 3b depicts the mast 31 in cross section on a plane parallel to the skin 27 near the opening 26.

Along its route, the duct 39 can be broken down into three mutually successive parts 39a, 39b and 39c. After leaving the evaporator 14, the fluid circulates through the part 39a produced in the jacket 41. The part 39a may snake its way through the jacket 41 between the leading edge 31a and the trailing edge 31b of the mast 31. The duct 39 then snakes its way through the jacket 40 via the part 39b. The route followed by the part 39b is, for example, a helical route around the internal cavity of the Pitot tube 30 at the end of which the total pressure is measured. The duct 39 continues its route through the part 39c by once again passing through the jacket 41 of the mast 31. As was the case with the part 39a, the part 39c may snake through the jacket 41 between the leading edge 31a and the trailing edge 31b. The route followed by the duct 39 is defined according to the probe zones that are to be heated for preference. In the example depicted, the duct 39 snakes through the appendage forming a single loop outside of the evaporator 14. It is also possible to create in the appendage several loops through which the heat-transfer fluid circulates in parallel outside of the evaporator 14, as indicated schematically in FIG. 1b. The self adaptation of the exchange of heat to the actual temperature of the external walls of the probe 25 allows for a more tolerant design of route than for a probe heated directly by an electrical resistance.

The cross section of the duct may vary along its route through the mast 31 and in the Pitot tube 30.

The fluid may be circulated in the duct 39 by means of a circulation pump 45 positioned upstream of the evaporator 14. The circulation pump 45 is advantageously positioned inside the skin 27 of the aircraft. Alternatively, it is possible to dispense with this circulation pump 45 by configuring the cross section of the duct 39 in its various parts 39a to 39c in such a way that the fluid circulates in its liquid phase through capillarity. Such a method of circulation does require relatively small cross sections. In order to maintain a sufficient overall flow rate, the duct 39 may comprise zones operating in parallel.

It is advantageous to produce the probe 25 and, more generally, any aeronautical equipment that implements the invention by using an additive manufacturing method to manufacture the mechanical component or components through which the duct 39 passes. This method is also known by the name of 3D printing. To date, it is known practice to produce metal components using this method. It is, for example, possible to employ titanium-based alloys, aluminum-based alloys, or, more generally, oxidation-proof alloys based on steel, on nickel and/or on chrome.

Figure 4:
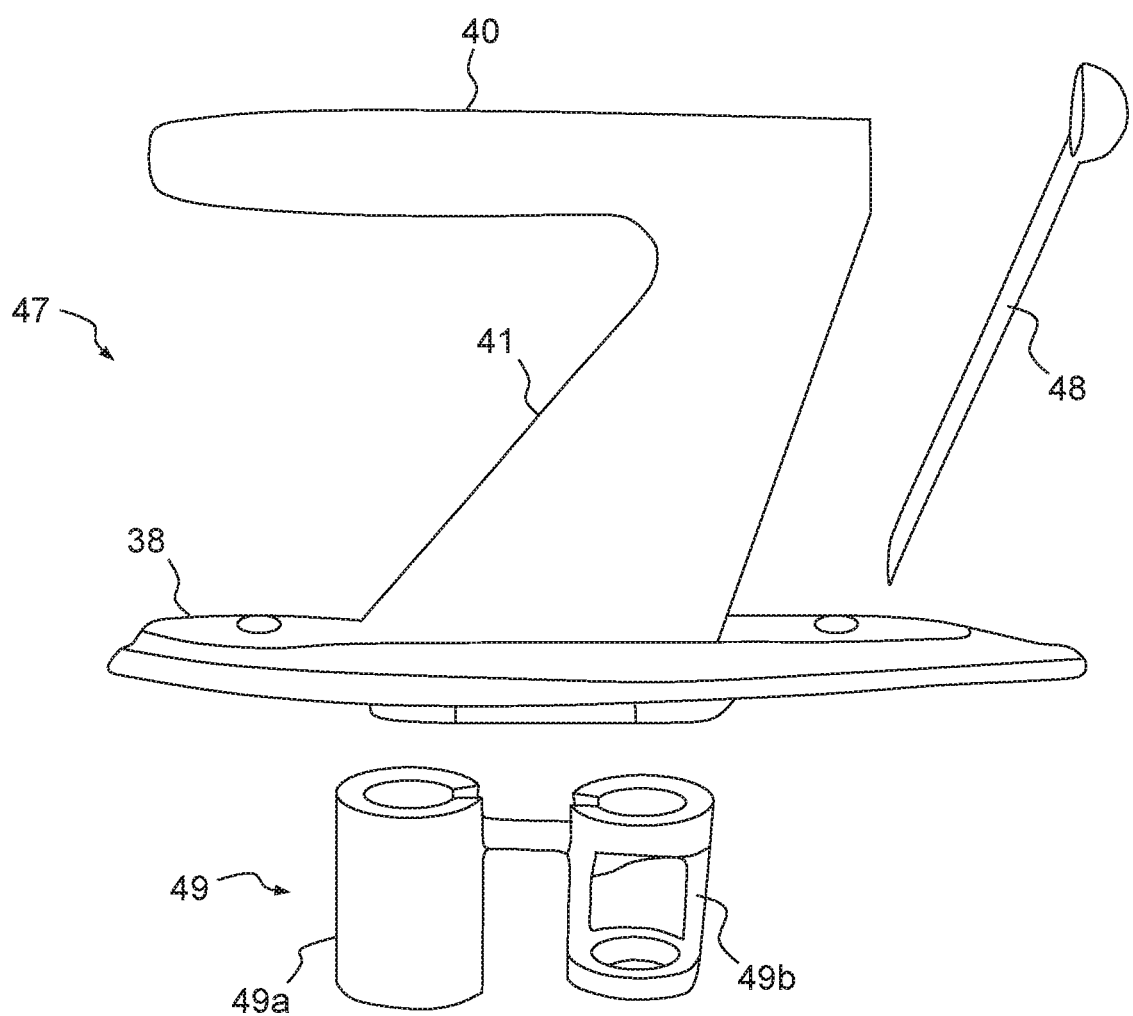
FIG. 4 is an exploded view of various component parts of the probe.

FIG. 4 is an exploded view of several mechanical components which, once assembled, form the probe 25. A body 47 forms the base 38 and the jackets 40 and 41. The duct 39 can be produced directly in the body 47 using additive manufacturing.

The body 47 may remain open at its trailing edge, for example so that the pneumatic ducts that allow total pressure to be measured can be positioned inside the body. Alternatively, these ducts may also be produced using the additive manufacturing method. The trailing edge 31a of the mast 31 and the end 36 of the Pitot tube may be closed by a plug 48 which may be produced using any type of manufacturing method. The shapes of the plug 48 are simpler than those of the body 47. For example it is possible to produce the plug 48 using molding. Of course additive manufacturing may also be used for the plug 48.

A support 49 may supplement the probe 25. The support 49 may be used to bear the pneumatic connector in a first part 49a and the evaporator 14 in a second part 49b. The support is assembled with the body 47 via the base 38.

Figure 5A:
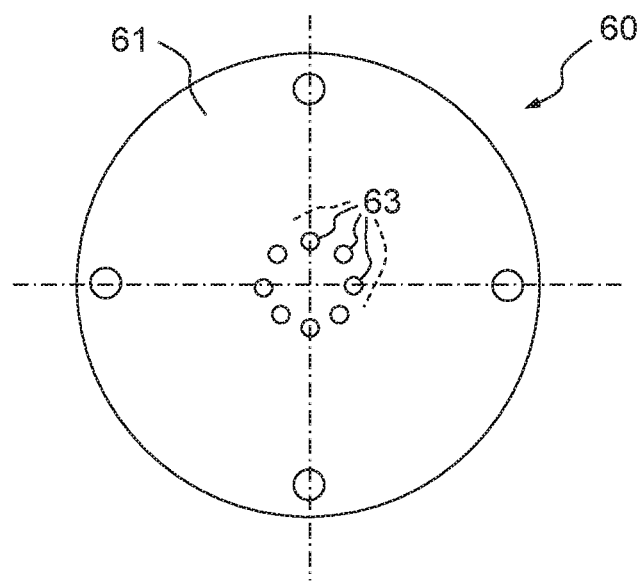
FIGS. 5a and 5b depict an aerodynamic probe intended to measure the static pressure and with which an aircraft is equipped.
Figure 5B:
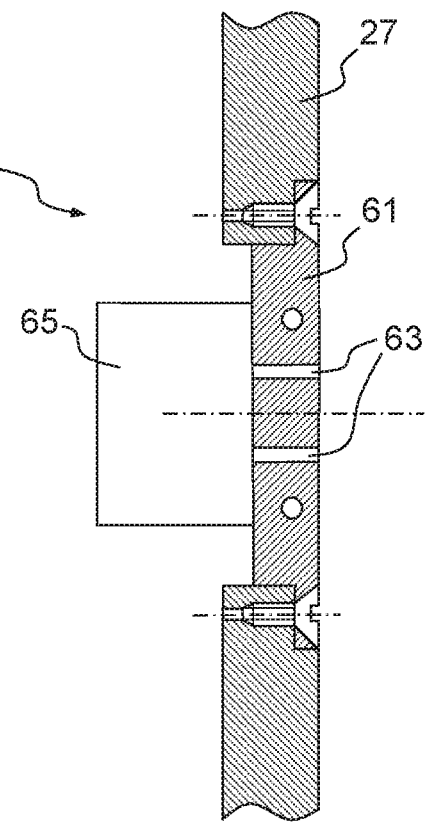

FIGS. 5a and 5b depict another aerodynamic probe 60 in which the invention may be implemented. More specifically, the probe 60 forms aeronautical equipment comprising a part 61 intended to lie flush with the skin 27 of the aircraft. FIG. 5a is a view in the plane of the skin 27 in the vicinity of the probe 60. FIG. 5b is a view in section perpendicular to the plane of the skin 27. The part 61 for example has the shape of a disk which plugs an orifice 62 of the skin 27. The orifice 62 is there to accommodate the part 61 which is fixed by screws to the skin 27. The probe 60 is, for example, a static pressure probe having one or more pressure tappings 63 formed of ducts opening substantially at rightangles to the skin 27. The duct 39 passes through the part 61. The duct snakes its way around the pressure tappings 63 so as to heat the part 61 and prevent the pressure tappings from becoming blocked with ice. In this embodiment, the duct 39 may also form a single loop or several parallel loops outside of the evaporator 14.

The probe 60 also comprises a part 65 internal to the skin 27. The internal part 65 is able to accommodate a pressure sensor connected to the pressure tappings so as to measure the static pressure of the air flowing along the skin 27. The internal part 65 may also accommodate the evaporator 14 and the reservoir 18.

As was the case with the probe 25, the part 61 is advantageously produced using an additive manufacturing method.

The invention claimed is:

1. An aerodynamic measurement probe intended to be fitted to an aircraft, the probe comprising a part intended to be sited in the region of a skin of the aircraft and a heater of the part, the heater comprising a thermodynamic loop comprising a closed circuit wherein a heat-transfer fluid circulates, the closed circuit comprising an evaporator and a zone wherein the heat-transfer fluid can be condensed in the aerodynamic measurement probe in order to heat the aerodynamic measurement probe; outside the evaporator, the circuit in which the fluid circulates being formed by a tubular duct of open cross section; and the probe further comprising a pump for circulating the heat-transfer fluid.

2. The aerodynamic measurement probe according to claim 1, wherein the duct is configured so that the fluid circulates therein through capillarity.

3. The aerodynamic measurement probe according to claim 1, wherein the tubular duct forms a single thermodynamic loop outside the evaporator.

4. The aerodynamic measurement probe according to claim 1, wherein the tubular duct forms several thermodynamic loops through which the heat-transfer fluid circulates in parallel outside the evaporator.

5. The aerodynamic measurement probe according to claim 1, wherein the part is configured to lie flush with the skin of the aircraft.

6. The aerodynamic measurement probe according to claim 1, wherein the part is an appendage configured to be positioned so that the appendage protrudes relative to the skin of the aircraft.

7. The aerodynamic measurement probe according to claim 6, further comprising a base intended to fix the equipment to the skin of the aircraft, wherein the appendage is positioned on a first side of the base and wherein the evaporator is positioned on a second side of the base, the opposite side to the first.

8. The aerodynamic measurement probe according to claim 1, wherein the heater comprises an electrical resistance allowing heat energy to be supplied to the evaporator.

9. A method of producing an aerodynamic measurement probe according to claim 1, the probe comprising a body wherein the tubular duct of open cross section is produced, wherein the body is produced using an additive manufacturing method.

10. A method of producing an aerodynamic measurement probe according to claim 7, wherein the appendage is produced using an additive manufacturing method.

* * * * *